INVENTOR.
WALTER R. KIMBERLEY
BY
ATTORNEYS

June 23, 1970  W. R. KIMBERLEY  3,516,397
FURNACE AND COMBUSTION CHAMBER THEREFOR
Filed April 29, 1968  3 Sheets-Sheet 3

INVENTOR.
WALTER R. KIMBERLEY
BY Price, Heneveld,
Huizenga & Cooper

ATTORNEYS

United States Patent Office
3,516,397
Patented June 23, 1970

1

3,516,397
FURNACE AND COMBUSTION CHAMBER THEREFOR
Walter R. Kimberley, Holland, Mich., assignor to Lear Siegler, Inc., Holland, Mich., a corporation of Delaware
Filed Apr. 29, 1968, Ser. No. 725,234
Int. Cl. F24h 3/06
U.S. Cl. 126—110                                     14 Claims

ABSTRACT OF THE DISCLOSURE

A combustion chamber for utilization in a furnace, either horizontal or vertical, embodying a heat exchanger having a series of side-by-side paths, alternate of the paths carrying flue gases and the other paths carrying the air to be warmed. The combustion chamber is of generally tubular configuration and has front and rear end walls. The rear end wall is substantially imperforate and the front end wall has an aperture therein for the reception of a burner such as an oil gun or gas gun. The chamber is provided with a series of apertures about the periphery thereof for escape of gases from its interior during operation of the burner.

---

This invention relates to furnaces and, more particularly, to a furnace-combustion chamber combination wherein the various components are highly compatible so as to provide maximum operating efficiency.

In U.S. Pat. No. 3,302,630, there is disclosed a heat exchanger suitable for utilization in furnaces of the hot-air variety. The exchanger consists primarily of a series of side-by-side channels, alternate of the channels carrying the air to be heated and the others carrying the hot flue gases. Furnaces of the type illustrated in this patent have been used primarily with oil gun heat sources under relatively small B.t.u. output operating conditions. It is desirable, consequently, to build the furnace as small and compactly as possible in order to minimize the expense thereof as well as permit installation in areas of limited space.

The heat exchanger illustrated in the patent noted was designed for operation in either vertical or horizontal position. Difficulty has been experienced in both of these modes of operation with the provision of a combustion chamber which will effectively insulate the sheet metal housing from direct contact with the major flame and, yet, permit efficient overall operation of the unit. More particularly, the subjection of the interior surfaces of the sheet metal heat exchanger to the direct blast of the oil gun results in a premature breakdown of the metallic shielding components and, thus, permits the escape of flue gases into the hot air passageways. This, of course, is a highly undesirable situation, resulting at best in the necessity of replacing the heat exchanger portion of the furnace. Previous attempts to shield the walls of the exchanger have resulted in a marked degradation of its operating efficiency and, thus, the furnace has met with limited commercial success despite its outstanding heat-exchanging capabilities.

It is an object of this invention, therefore, to provide a combustion chamber for utilization in furnaces of the type described which is not subject to the disadvantages outlined above.

More particularly, it is an object of this invention to provide a combustion chamber-heat exchanger combination wherein the flame from the oil gun or other source of heat is deflected from direct contact with the metal jacket of the exchanger and, yet, is circulated through the burning and flue gas sections of the exchanger in such a manner as to permit optimum heat-exchange efficiency.

It is an object of this invention, additionally, to provide a combustion chamber specifically designed for use within the furnace when it is being operated in a horizontal mode and a differing combustion chamber for use in the upright or vertical mode. Each of these combustion chambers, of course, possess common structural and functional characteristics such as the deflection of the flame from direct contact with the heat-exchanger jacket and the distribution of the flame and gases generated thereby within the exchanger so as to permit maximum heat-exchange efficiency.

It is yet a further object of this invention to provide a combustion chamber for a furnace of the type described which may be installed easily so as to permit field installation of the chamber subsequent to a decision as to whether the furnace is to be utilized in the horizontal or vertical mode of operation.

These as well as other objects of this invention will be readily understood with reference to the following specification and accompanying figures in which.

Figure 1:
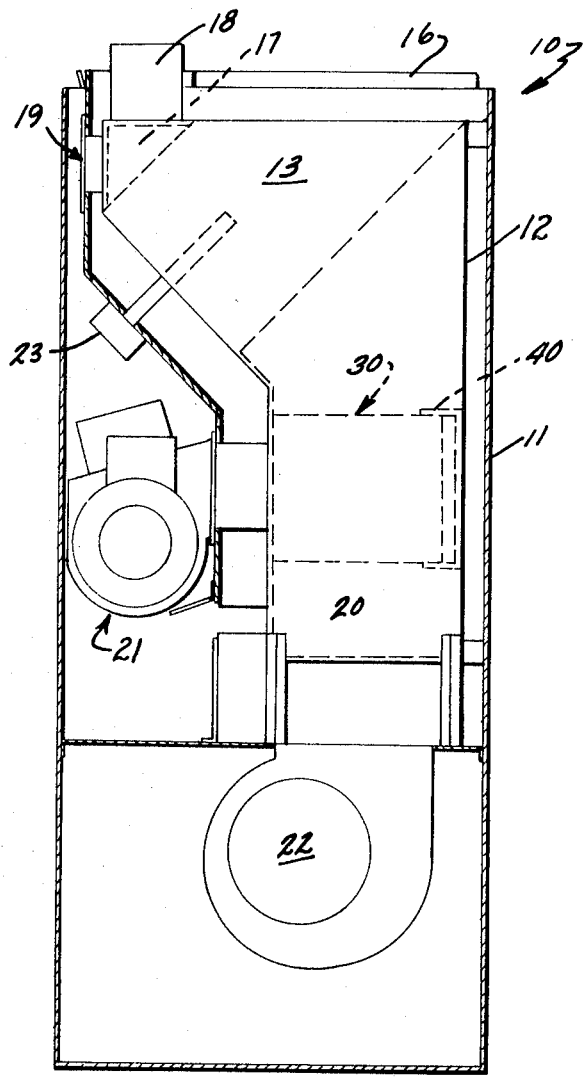
FIG. 1 is a side-elevational view, partially in cross section, of the novel furnace-combustion chamber combination in the vertical mode of operation.

Briefly, this invention comprises a forced air furnace having a heat exchanger with a radiator section, a burning section and a flue gas exit section. An outer envelope having a cold aid intake and a hot air outlet surrounds the exchanger. The radiator section has a plurality of passageways, some of which are isolated from flue gases produced in the burning section, but communicate with the space between the outer envelope and heat exchanger to form hot air passageways. Others of the passageways extend from tne burning section to the flue gas exit section to form flue gas passageways through which products of the burning section pass. The combustion chamber is positioned within the burning section and comprises a generally tubular chamber having front and rear end walls. The rear end wall is substantially imperforate and the front end wall has an aperture therein for reception of the burner. The chamber has a series of apertures about the periphery thereof for escape of gases from its interior when the burner is activated.

Referring now to the figures, preferred embodiments of this invention will be described in detail. Referring initially to FIGS. 1 through 7, there is illustrated an upright furnace 10 having an outer casing or envelope 11 within which is positioned a heat exchanger 12 fabricated generally in accordance with the patent noted heretofore. The heat exchanger 12 has a radiator section 13 having a series of hot air passageways 14 and flue gas passageways 15. A hot-air outlet 16 is provided at the top of the furnace. The flue gases exit from the radiator section 13 into a flue gas collection chamber 17 and thence to the chimney or other venting device via outlet 18. The furnace is provided with a cleanout port 19 through which access may be gained to the various channels in the radiator section 13 for cleaning purposes.

The heat exchanger 12 is provided with a burning section 20 within which the combustion chamber 30, to be discussed in detail hereinafter, is positioned. A conventional oil gun 21 is positioned so as to inject its flame into the interior of the chamber 30 which is retained in position at the rear side of the furnace by a bracket 40 into which the chamber is slid during installation.

A blower 22 activated by a conventional stack temperature sensor 23 is positioned within the bottom of the furnace 10 such that the air blown therefrom circulates upwardly between the burning section 20 and the envelope 11, through the hot-air passageways 14 of the radiator section 13 and thence into the distribution ductwork through the outlet 16. As is pointed out in detail in the noted patent, portions of this air flow around the side of the heat exchanger to the outlet 16 and do not pass through the radiator section 13 as a means of utilizing all possible heat-exchange area within the furnace. The flue gases pass upwardly from the burning section 30, through the flue gas passageways 15, into the collection chamber 17 and thence out of the furnace via outlet 18 to a suitable pipe or the like. If desired, a baffle of the type shown in the patent noted may be utilized to restrict the flow of flue gases from the furnace.

From an examination of FIG. 1, it will be obvious that the rear of the combustion chamber 30 is positioned relatively close to the rear wall of the heat exchanger 12. The combustion chamber 30, as shown in FIGS. 4 through 7, includes an imperforate rear wall 31 which functions to deflect the direct flames from the oil gun 21 away from this section of the heat exchanger and, thus, prevents a burning away of the metal at this location. The chamber 30 has a front wall 32 having an aperture 33 therein for reception of the oil gun 21. Aperture 33, conveniently, is provided with a reinforcing collar 39 about its interior periphery to assist in the positive retention of the forward extremity of the chamber by the oil or gas gun 21.

Figure 2:
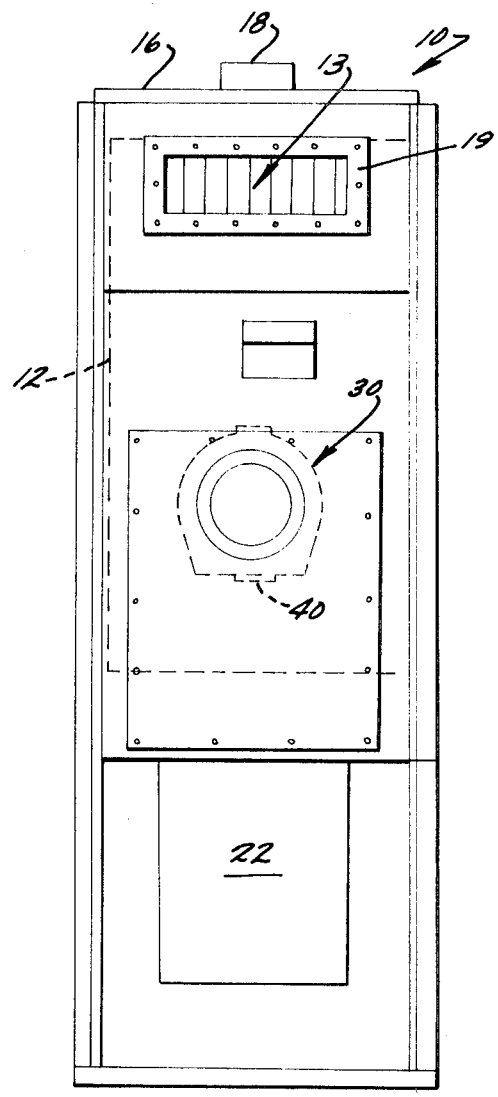
FIG. 2 is a front-elevational view of the furnace shown in FIG. 1.
Figure 3:
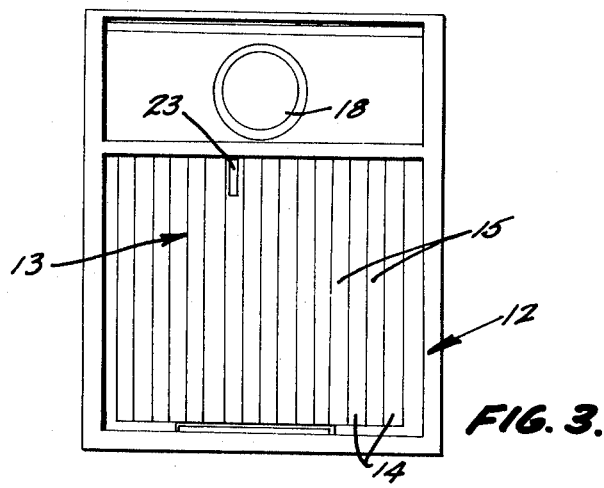
FIG. 3 is a plan view of the radiator section of the furnace shown in FIGS. 1 and 2.
Figure 4:
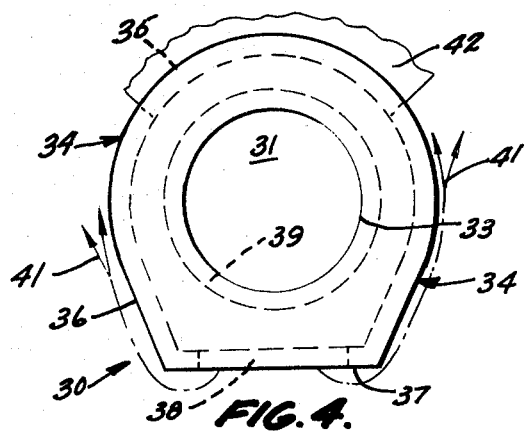
FIG. 4 is a front-elevational view of the combustion chamber shown in the furnace of FIG. 1.
Figure 5:
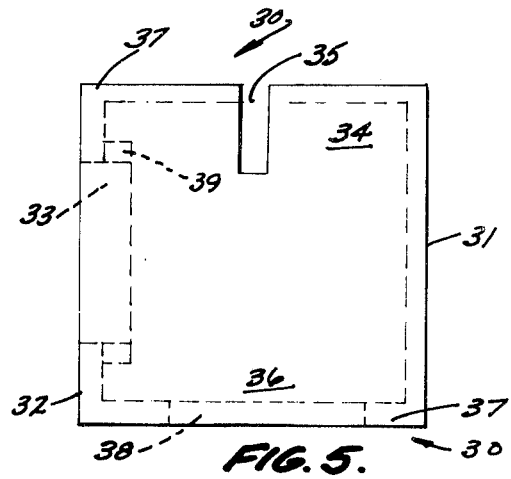
FIG. 5 is a side-elevational view thereof.
Figure 6:
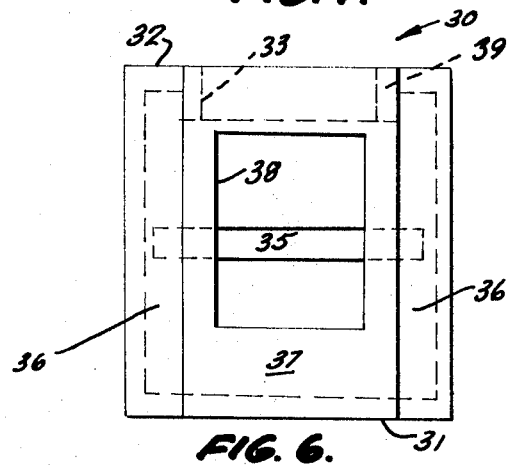
FIG. 6 is a bottom view thereof.
Figure 7:
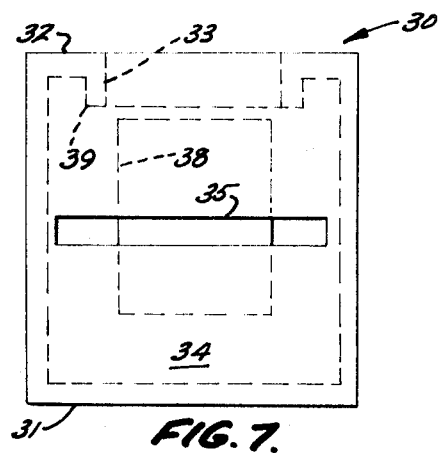
FIG. 7 is a plan view thereof.

The chamber 30, as illustrated best in FIG. 4, is generally tubular in configuration, having a constant-radius, curved upper sidewall section 34. Within upper sidewall section 34 is cut or, more accurately, molded a slot 35. Slot 35 extends transverse to the longitudinal axis of the chamber and, as illustrated, extends around approximately one-third of the periphery of the chamber. More specifically, the length of slot 35 lies in a plane which is perpendicular to the central axis of the chamber 30. The slot 35 is relatively narrow in width and is positioned facing upwardly as illustrated in FIG. 2 when the chamber is installed into the furnace.

A pair of converging lower sidewall sections 36 extend downwardly from the curved upper sidewall 34 of the chamber. The extremities of the lower sidewalls 36 are connected by means of a generally planar base 37 which has a rectangular area cut out therefrom or molded therein during the fabrication process. The rectangular opening 38, as illustrated in FIG. 2, faces directly downwardly after installation of the combustion chamber 30 within the furnace 10.

When the furnace 10 is installed and the oil gun fired, flame is shot under high pressure into the interior of the combustion chamber 30 in conventional fashion. This flame and the resultant combustion gases must escape either through the rectangular aperture 38 or the aperture 35 on the periphery of the chamber. The majority of the gases, of course, flow out of the chamber through the rectangular aperture 38 since it is the largest. These flames and gases, as indicated by the arrows 41 in FIG. 4, flow upwardly around the sides of the combustion chamber passing in close proximity to the sidewalls of the heat exchanger 12. They exit from the exchanger through the various flue gas passageways 15, the collection chamber 17 and the outlet 18. The flames and gases shooting from the upper rectangular aperture 35 form a generally fan-shaped wall such as illustrated by the reference numeral 42 in FIG. 4. These flames distribute themselves around the interior of the burning section 20, exiting therefrom in a manner identical to the flames from aperture 38.

The combustion chamber 30 functions, therefore, to distribute the flames and gases evenly over the interior of the burning section 20 and, of course, within the heat-exchanger 12. This distribution is accomplished without permitting the flame to impinge directly from the gun onto the sidewall of the heat exchanger and, thus, no metal burnout problems are encountered.

FIGS. 8 through 13 illustrate a furnace unit which is virtually identical to that discussed previously with the exception that it has been rigged for operation in the horizontal mode. More particularly, the horizontal furnace 50 has been installed on its side, the oil gun and blower rotated and a modified type of combustion chamber utilized. As viewed in FIGS. 8 and 9, the horizontal furnace 50 comprises an outer casing 51 having a heat-exchanger 52 positioned therein. Heat-exchanger 52 has a radiator section 53 having hot air passageways and flue gas passageways. The furnace is provided with a hot air outlet 56, a flue gas collection chamber 57 and a flue gas outlet 58. The cleanout port is indicated by the reference numeral 59 and the combustion chamber 70 is positioned within the burning section 60 of the heat exchanger 52.

An oil or gas gun 61 identical to that described in connection with FIGS. 1 and 2 is installed in the furnace in the position shown. The blower 62 blows the air to be warmed between the outer jacket or envelope 51 and the heat exchanger as well as through the hot air passageways into the ductwork communicating therewith. The blower 62 is activated by a conventional stack temperature sensor 63.

Figure 8:
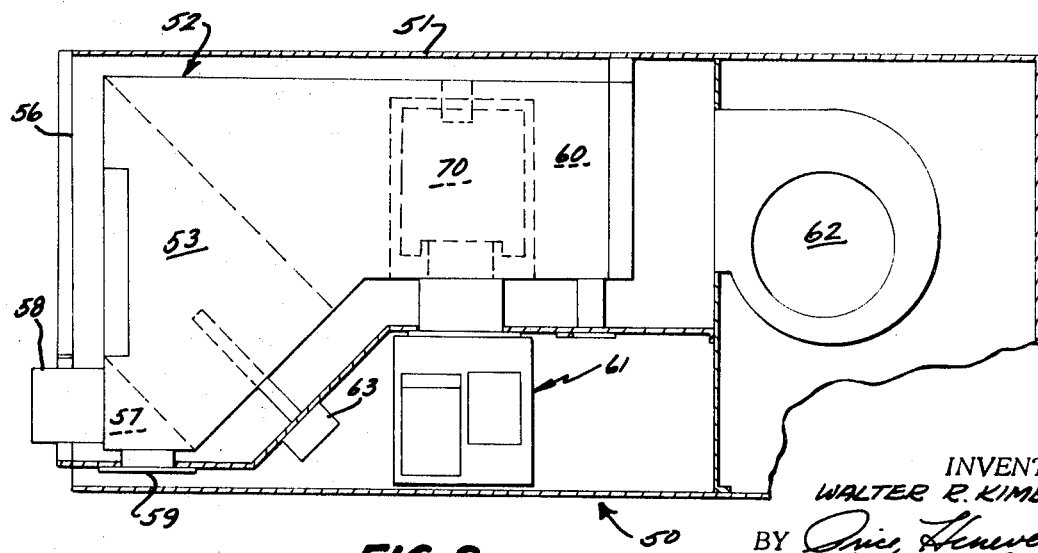
FIG. 8 is a plan view, partially in cross section, of the furnace-combustion chamber combination utilized in the horizontal mode of operation.
Figure 9:
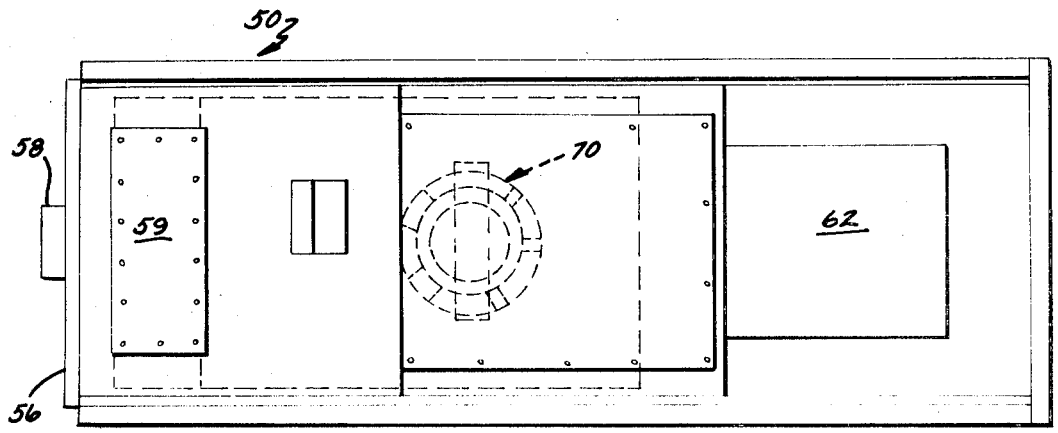
FIG. 9 is a side-elevational view of the furnace shown in FIG. 8.

When the furnace shown in FIGS. 1 and 2 is laid on its side for operation in the horizontal mode as indicated in FIGS. 8 and 9, the combustion chamber 70 shown in FIGS. 10 through 13 is utilized. This chamber is of generally tubular configuration as was the case with the chamber discussed previously. It does not, however, incorporate one flat side, but rather is cylindrical having a constant radius. The chamber has an imperforate rear wall 71 and a forward wall 72 having a gun-receiving aperture 73 therein. The aperture 73 is provided with a reinforcing collar 74 in order to positively support the chamber within the furnace. A positioning slot or other type of mark 75, conveniently, may be provided to insure proper positioning when the chamber is installed within the furnace. About the periphery of combustion chamber 70 are spaced a series of five apertures having the configurations illustrated in FIGS. 11 through 14. More specifically, as viewed in FIG. 10, the chamber incorporates a rather wide and long aperture 76 in the upper left-hand quadrant thereof; a long and rather narrow aperture 77 in the upper right-hand quadrant thereof; a short and rather narrow aperture 78 at the division between the upper and lower right-hand quadrants; a long and rather narrow aperture 79 in the lower right-hand quadrant thereof; and a long and rather wide aperture 80 in the lower left-hand quadrant thereof. The apertures 76 and 80 are identical as are the apertures 77 and 79.

Figure 10:
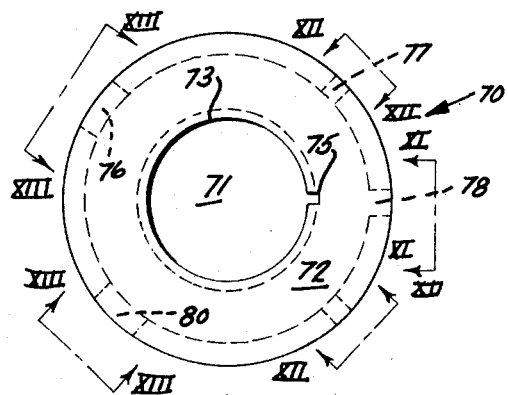
FIG. 10 is a front-elevational view of a combustion chamber suitable for utilization in the furnace illustrated in FIGS. 8 and 9.
Figure 11:
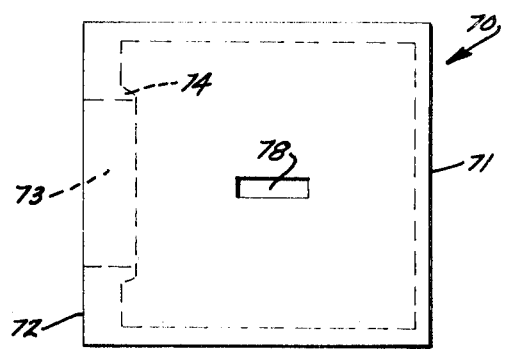
FIG. 11 is a side-elevational view of the horizontal furnace combustion chamber illustrating the configuration of the aperture indicated at the plane XI—XI of FIG. 10.
Figure 13:
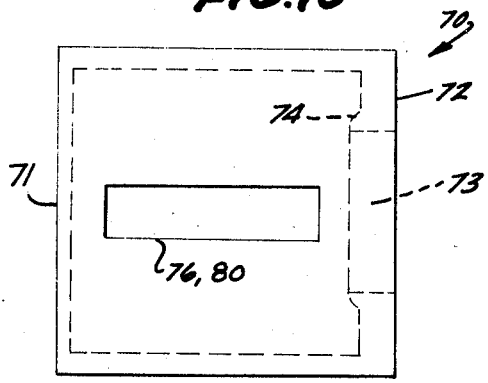
FIG. 13 is a side-elevational view of the horizontal furnace combustion chamber illustrating the configuration of the apertures indicated at the planes XIII—XIII of FIG. 10.
Figure 12:
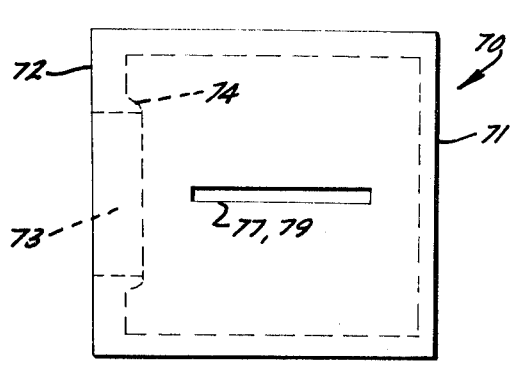
FIG. 12 is a side-elevational view of the horizontal furnace combustion chamber illustrating the configuration of the apertures indicated at the planes XII—XII of FIG. 10.

The combustion chamber illustrated in FIGS. 10 through 13 functions, when installed within the furnace 50 in the position shown in FIGS. 9 and 10, to evenly distribute the flame and combustion gases over the interior of the burning section 60 of the heat exchanger without permitting direct impingement of the flame from the oil gun onto the metallic barriers. Rather large portions are directed through the larger apertures 76 and 80 generally toward the radiator section of the exchanger while smaller amounts of gases and flame are permitted to escape at the other side of the chamber and be drawn along the right-hand portions of the heat exchanger (as viewed in FIG. 9) by the draft. The combustion gases pass through the passageway 55, into the collection chamber 57 and away from the furnace via the outlet 58 in a manner identical to that discussed in connection with the vertical furnace illustrated in FIGS. 1 and 2.

The combustion chambers 30 and 70 are cast or otherwise suitably fabricated from an inflammable material recommended for use in this type of operative environment. One such material which has been found satisfactory is sold under the trademark Cera-Form by the John Mansville Company. The positioning of the peripheral slots in the chambers in the manner shown, functions, as noted previously, to retard the impingement of direct flame on and, thus, the over heating of the heat-exchanger jacket. By utilizing the chambers illustrated, it is possible to reduce the gauge of metal ordinarily required within the furnace and, thus, render its construction more economical.

While a preferred embodiment of this invention and minor modifications thereof have been illustrated in detail, it will be readily apparent to those skilled in the art that other embodiments may be conceived and fabricated without departing from the spirit of this specification and the accompanying drawings. Such other embodiments are to be deemed as included within the scope of the following claims unless these claims, by their langauge, expressly state otherwise.

The embodiments of the invention in which an exclusive property or privilege is claimed are defined as follows:

1. In a vertically disposed forced air furnace having a heat exchanger with a radiator section, a burning section and a flue gas exit section; an outer envelope surrounding said heat exchanger, said outer envelope having a cold air intake and a hot air outlet; said radiator section having a plurality of passageways, some of said passageways being isolated from flue gases produced in said burning section but communicating with the space between said outer envelope and said heat exchanger to form hot air passageways, other of said passageways extending from said burning section to said fluid gas exit section to form flue gas passageways through which the products of said burning section pass; the improvement comprising a combustion chamber positioned within said burning section, said chamber being of generally tubular configuration and having front and rear end walls, the rear end wall being substantially imperforate and the front end wall having an aperture therein for reception of a burner, said chamber having a generally planar base and a smoothly curved upper section, and a series of apertures about the periphery thereof for escape of flame and gases from the interior thereof, one of said apertures being in said base and another of said apertures being in the top of said upper section, the aperture in said upper section being an elongated aperture whose length lies in a plane which is transverse to the central axis of said chamber.

2. The furnace as set forth in claim 1 wherein said smoothly curved upper section has a constant radius of curvature.

3. The furnace as set forth in claim 1 wherein said elongated aperture lies in a plane which is perpendicular to the central axis of said chamber.

4. The furnace as set forth in claim 3 wherein the aperture in said base of rectangular.

5. The furnace as set forth in claim 1 wherein the aperture in said base is larger in dimension as compared to said elongated aperture.

6. In a forced air furnace having a heat exchanger with a radiator section, a burning section and a flue gas exit section; an outer envelope surrounding said heat exchanger, said outer envelope having a cold air intake and a hot air outlet; said radiator section having a plurality of passageways, some of said passageways being isolated from flue gases produced in said burning section but communicating with the space between said outer envelope and said heat exchanger to form hot air passageways, others of said passageways extending from said burning section to said flue gas exit section to form flue gas passageways through which the products of said burning section pass; the improvement comprising a combustion chamber positioned within said burning section, said chamber being of generally tubular configuration and having front and rear end walls, the rear end wall being substantially imperforate and the front end wall having an aperture therein for reception of a burner, said chamber having a series of apertures about the periphery thereof for escape of flame and gases from the interior thereof, and means affixed to the interior wall of said burning section for supporting said chamber at the rear end wall thereof in close proximity to said interior wall.

7. The furnace as set forth in claim 6 wherein the upper section of said chamber is smoothly curved.

8. The furnace as set forth in claim 7 wherein said smoothly curved upper setcion has a constant radius of curvature.

9. The structure as set forth in claim 6 wherein said furnace is a vertical furnace and wherein said chamber has a smoothly curved upper section from which depend converging lower sidewalls, said sidewalls being connected together by a generally planar base, one of said apertures being in said base and another of said apertures being in said upper section.

10. The furnace as set forth in claim 9 wherein the aperture in said upper section is an elongated aperture whose length lies in a plane which is transverse to the central axis of said chamber.

11. The furnace as set forth in claim 10 wherein the aperture in said base is large in dimension as compared to said elongated aperture.

12. The furnace as set forth in claim 11 wherein the aperture in said base is rectangular.

13. In a horizontally disposed forced air furnace having a heat exchanger with a radiator section, a burning section and a flue gas exit section; an outer envelope surrounding said heat exchanger, said outer envelope having a cold air intake and a hot air outlet; said radiator section having a plurality of passageways, some of said passageways being isolated from flue gases produced in said burning section but communicating with the space between said outer envelope and said heat exchanger to form hot air passageways, others of said passageways extending from said burning section to said fluid gas exit section to form flue gas passageways through which the products of said burning section pass; the improvement comprising a combustion chamber positioned within said burning section, said chamber being of generally tubular configuration and having front and rear end walls, the rear end wall being substantially imperforate and the front end wall having an aperture therein for reception of a burner, said chamber having a series of at least four elongated apertures about the periphery thereof for escape of flame and gases from the interior thereof, said elongated apertures lying parallel to the axis of said chamber, at least two of said apertures being directed generally toward said radiator section and the others of said apertures being directed generally toward the end of said burning section opposite from said radiator section, the size of said two apertures being substantially greater than the size of those apertures directed generally toward the end of said burning section opposite from said radiator section.

14. The furnace as set forth in claim 13 wherein said chamber further comprises a fifth aperture directed toward the end of said burning section opposite from said radiator section.

References Cited

UNITED STATES PATENTS 3,302,630 2/1967 Volk _____ 126—110
3,382,862 5/1968 Martz _____ 126—110

CHARLES J. MYHRE, Primary Examiner

U.S. Cl. X.R.

126—116